April 12, 1955  C. E. TACK  2,706,021
YIELDABLE AND ADJUSTABLE BRAKE BEAM AND HEAD ASSEMBLY
Filed Feb. 3, 1951  2 Sheets-Sheet 1
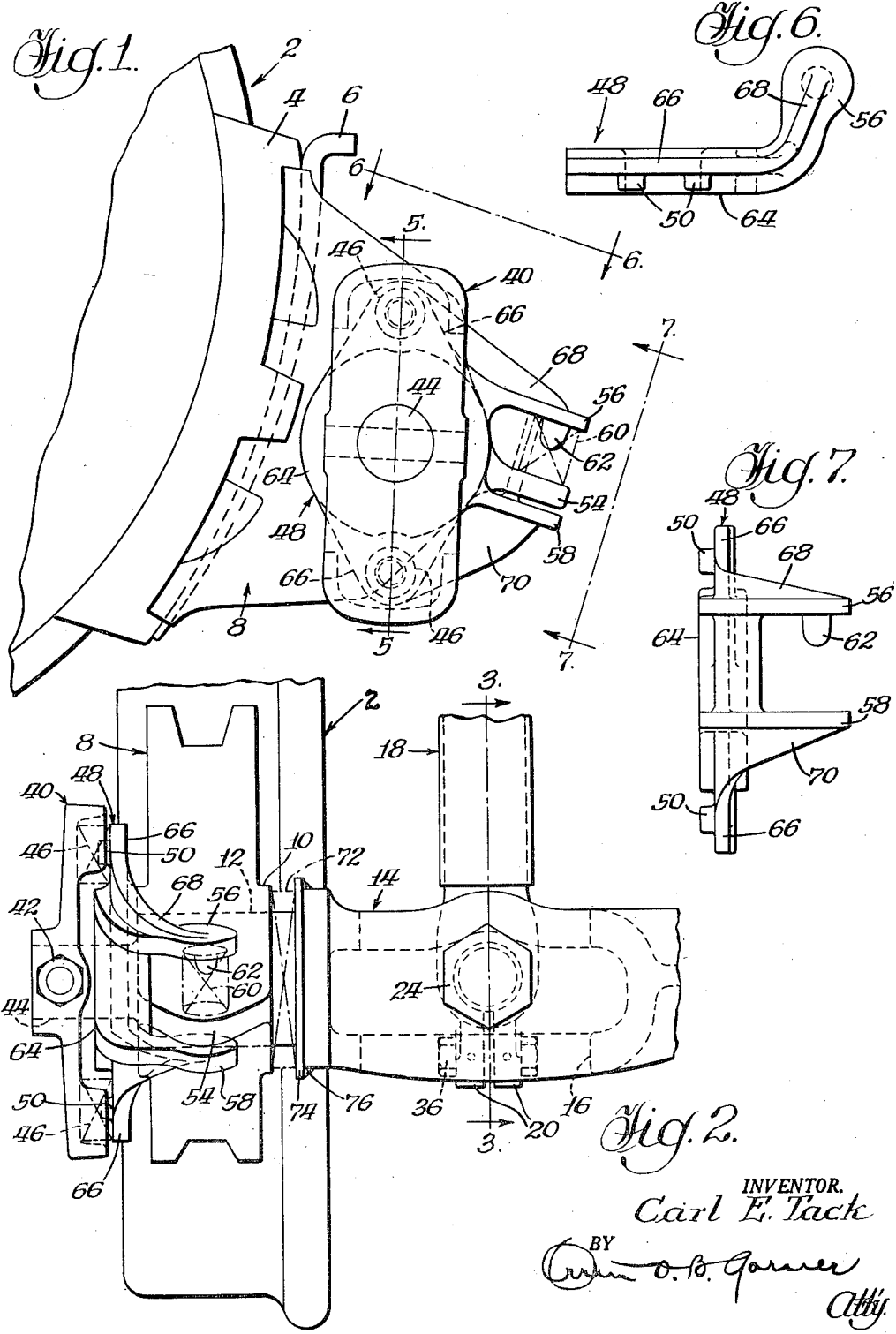
INVENTOR.
Carl E. Tack
BY
O. B. Garner
Atty.

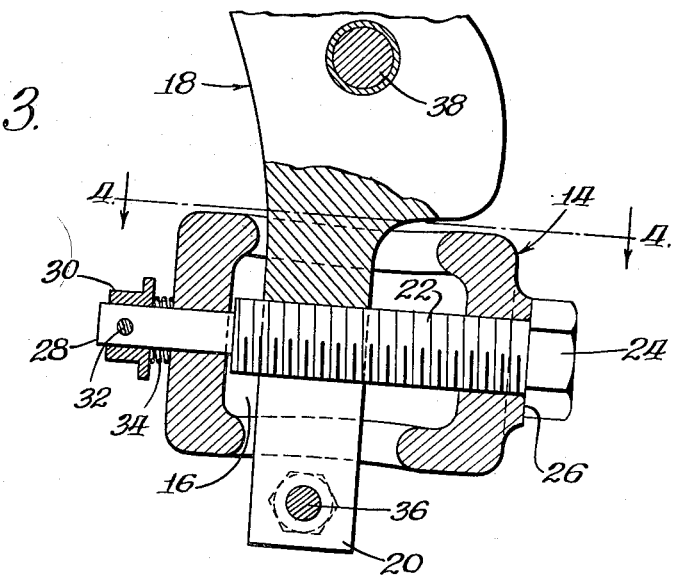
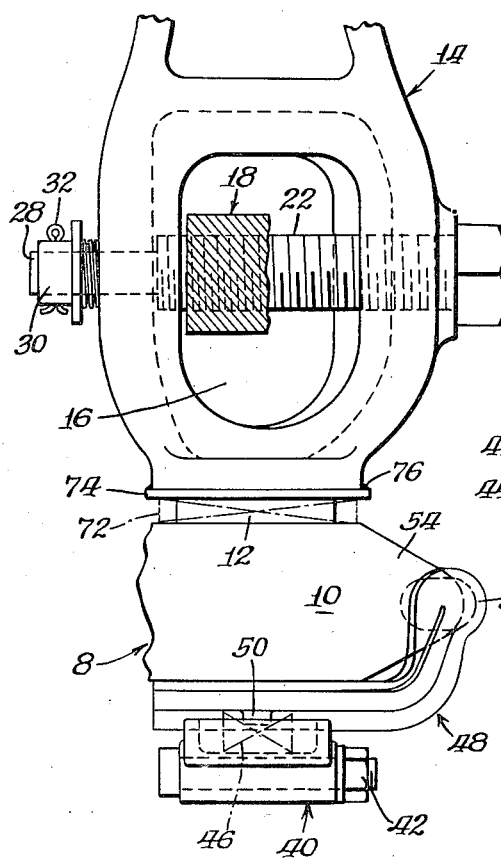
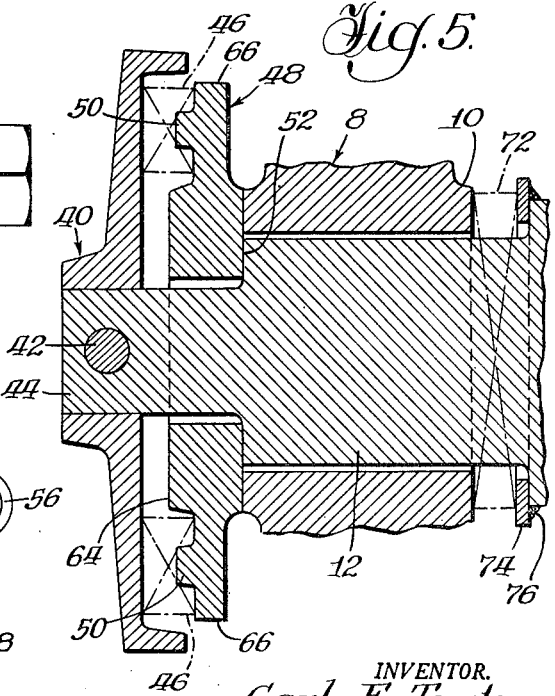

United States Patent Office 2,706,021
Patented Apr. 12, 1955

2,706,021

YIELDABLE AND ADJUSTABLE BRAKE BEAM AND HEAD ASSEMBLY

Carl E. Tack, Chicago, Ill., assignor to American Steel Foundries, Chicago, Ill., a corporation of New Jersey Application February 3, 1951, Serial No. 209,221

8 Claims. (Cl. 188—221.1)

This invention relates to brakes and more particularly to novel means for regulating the position of a brake head relative to its actuating lever in a railway brake arrangement.

A primary object of the invention is to control the relative position of a brake head relative to its actuating lever to which the head is connected as, for example, by a brake beam having a trunnion upon which the head is rotatably mounted.

Another object of the invention is to control clearance between the braked member and the brake head which ordinarily carries a removably mounted friction shoe engageable with said member.

A further object of the invention is to provide positive release for the brake head by rotating it in an opposite direction to the direction of rotation of the actuating lever during release thereof.

Another object of the invention is to provide means to automatically compensate for wear between the braked member and the brake shoe.

Still another object of the invention is to provide, in an arrangement such as above described, additional means for maintaining the brake head in a predetermined axial position with respect to its actuating lever.

The foregoing and other objects and advantages of the invention will become apparent from a consideration of the following specification and the accompanying drawings, wherein:

Figure 1 is a fragmentary side elevational view of a brake arrangement embodying the invention;

Figure 2 is a rear elevational view of the structure shown in Figure 1;

Figure 3 is a sectional view on the line 3—3 of Figure 2;

Figure 4 is a fragmentary top plan view of the device with the brake lever broken away, along the line 4—4 of Figure 3, to clarify the illustration;

Figure 5 is a fragmentary sectional view on the line 5—5 of Figure 1;

Figure 6 is a top plan view of the friction arm shown in Figures 1 to 5 and is taken on the line 6—6 of Figure 1, and Figure 7 is a rear elevational view of the friction arm taken on the line 7—7 of Figure 1.

Describing the invention in detail, the novel brake arrangement is illustrated as applied to a conventional railway wheel and axle assembly fragmentarily indicated at 2 in Figures 1 and 2. The wheel of said assembly is adapted to be frictionally engaged by a conventional brake shoe 4, removably keyed as at 6, in the usual manner, to a brake head 8, having a hub 10, rotatably mounted on a trunnion 12, of a brake beam, generally designated 14.

The brake beam comprises an eye 16 disposed inboardly of the trunnion 12, and a brake lever 18 extends into the eye. The lower end of the lever is split to form spaced lugs 20 having threaded engagement with an adjustor bolt 22. The bolt comprises a head 24 frictionally engaged as at 26 with a beam 14 at one side of the eye, and the opposite end of the bolt is provided with a relatively smaller-diameter portion 28 on which a spring cap 30 is mounted, as by means of a cotter pin 32. The spring cap 30 compresses a spring 34 against the beam 14 at the opposite side of the eye to frictionally engage the head 24 of the bolt 22 with the beam 14 as at 26. The lugs 20 of the lever 18 are interconnected by a bolt and nut assembly 36 to adjust friction between the threads of the bolt 22 and the mated threads of the lever 18. By means of this novel arrangement, the brake head 8 may be adjusted toward and away from the wheel 2.

The brake lever 18 is afforded pivotal mounting as by a bushed pin 38, as more or less diagrammatically illustrated in Figure 3. Thus as the lever 18 is rotated by actuating means (not shown) in a clockwise direction about the pivot pin 38, the brake head 8 is urged toward the wheel and axle assembly 2, thereby engaging the brake shoe 4 therewith. Upon release of the brake lever 18, it rotates in a counterclockwise direction about the pivot pin 38 to rotate the brake head 8 away from the wheel and axle assembly 2 thereby disengaging the brake shoe 4 therefrom.

It will be understood that, as the brake lever 18 rotates during release thereof in a counterclockwise direction about the pin 38, the upper edge of the shoe 4 normally tends to drag against the wheel of the wheel and axle assembly 2. To prevent this undesirable condition, the invention comprises novel means for rotating the brake head 8 in the opposite direction to the direction of rotation of the lever 18 upon release thereof, thereby preventing the upper edge of the brake shoe 4 from dragging against the wheel. These novel means comprise a spring plate 40 removably secured as by a bolt and nut assembly 42 to a smaller-diameter portion 44 of the brake beam trunnion 12. The spring plate 40 is preferably sleeved over the trunnion portion 44 and compresses spring means, illustrated in the form of a pair of coil springs diagrammatically indicated at 46, 46, against the outboard sides of a friction arm 48, which is preferably provided with bosses 50, 50 for positioning the springs 46 relative to the arm 48. As best seen in Figure 5, the arm 48 is urged by the springs 46 into frictional engagement as at 52 with an annular friction surface defined by the outboard extremity of the trunnion 12, which, as above noted, merges with the smaller-diameter portion 44. As best seen in Figures 1, 2 and 4, the brake head hub 10 is provided with a rearwardly extending lug or lever arm 54 received between top and bottom lugs or abutments 56 and 58 of the friction arm 48. A spring, herein diagrammatically illustrated as a coil compression spring 60, is compressed between the lugs 54 and 56 and is preferably positioned by a boss 62 depending from the lug 56.

As best seen in Figures 1, 6 and 7, which illustrates the friction arm 48 in detail, this member comprises a generally annular hub 64 sleeved over the beam portion 44 and provided with upwardly and downwardly projecting spring seats 66 against which the before mentioned springs 46 are compressed. The hub 64 is also connected to the before mentioned arms 56 and 58 which, as best seen in Figures 6 and 7, project inboardly from the hub 64. The top of the arm 56 is connected to the upper spring seat 66 by a continuous flange or web 68, and the bottom of the arm 58 is connected to the lower spring seat 66 by another continuous flange or web 70, said webs 68 and 70 being approximately of the same thickness as the spring seats 66 and following the contour of arms 56 and 58, as will be best understood by consideration of Figures 6 and 7.

The brake head 8 is preferably urged into frictional engagement with the inboard side of the friction arm hub 64 by resilient means, herein illustrated in the form of a coil compression spring 72, compressed between the inboard side of the brake head hub 10 and a spring plate 74 secured as by welding at 76 to the brake beam 14 at the inboard end of its trunnion 12. It will be understood by those skilled in the art that the spring 72 prevents undesired axial movements of the brake head 10 in either the applied or released position thereof and is adapted at all times to afford a compact, rattle free arrangement.

In operation of the novel brake arrangement, the brake lever 18 is rotated in a clockwise direction about its pivot pin 38 to actuate the brake head 8 and brake shoe 4 to applied position thereof, as shown in Figure 1, with the brake shoe 4 engaging the periphery of the wheel of the wheel and axle assembly 2. Under these conditions, the spring 60, as shown in Figure 1, is compressed between the brake head lug 54 and the upper friction arm lug 56, the lug 54 being spaced from the lower friction arm lug 58. The brake is released by rotation of the lever 18 in a counterclockwise direction about its pivot pin 38, whereupon the spring 60 rotates the brake head 8 and shoe 4 in a clockwise direction about the trunnion 12, the rotational axis of the brake head being approximately parallel to that of the brake lever. This clockwise rotation of the brake head 8 is limited by engagement of its lug 54 with the lower friction arm lug 58. As the brake is reapplied, it will be understood that the engagement of the shoe 4 with the wheel of the assembly 2 rotates the brake head 8 and shoe 4 in a counterclockwise direction as the brake lever 18 is rotated in a clockwise direction to actuate the brake shoe 4.

As the shoe 4 and the wheel surface against which it engages become worn in service, the counterclockwise rotation of the brake head 8 is necessarily greater until finally compression of the spring 60 against the upper friction arm lug 56 is effective to overcome friction between the hub 64 of the friction arm 48 and the outboard end of the trunnion 12, whereupon the friction arm 48 is rotated in a counterclockwise direction with the brake head to a new position in which the friction arm 48 is held by the springs 46 until subsequent wear of the shoe 4 and wheel again cause rotation of the arm 48. Excessive rotation of the friction arm 48 in this manner is prevented by providing the above mentioned adjusting bolt 24, which may be operated manually to provide for wear between the shoe and wheel.

Thus it will be understood that the spring 60 is preferably of such capacity that the force exerted thereby, immediately prior to the so-called "solid" condition of the spring wherein the coils thereof bear against each other, is sufficient to overcome the frictional resistance to rotation of the friction arm 48, which resistance is afforded by the pressure of the springs 46.

I claim:
1. In a brake arrangement for a brake surface of a railway wheel; the combination of a lever member rotatably mounted on an axis, said lever member being rotatable in one of a clockwise and counterclockwise directions to apply the brake and being rotatable in the other of said directions to release the brake, a brake head member, means rotatably interconnecting said members to accommodate rotational movement of the head member on an axis approximately parallel to the first mentioned axis, a lug on the head, a pair of spaced lugs, spring means compressed between the head lug and one of the second mentioned lugs to urge the head lug against the other of the second mentioned lugs when the brake is released, friction shoe means engageable with the wheel surface and conforming in shape to a segment of said surface, said shoe means being carried by said head, whereby when said brake is applied, the head is pivoted on said axis in said other of said directions to compress the spring and when the brake is released, the head is pivoted on said axis in said one direction to prevent dragging of the shoe means on the wheel, and means for accommodating wear of said wheel surface and shoe means, said accommodating means comprising a hub connected to said spaced lugs and rotatably mounted on said first mentioned means for rotatable movement on the second mentioned axis, and spring means urging the hub into frictional contact with a friction surface of the first mentioned means, the capacity of the last mentioned spring means being less than the maximum capacity of the first mentioned spring means, whereby upon predetermined compression of the first mentioned spring means said hub is rotated against said friction surface.

2. In a brake head arrangement for a railway wheel; the combination of a lever, a brake head, means pivotally connecting the head to the lever, friction means carried by the first mentioned means and pivotal on a common axis with the brake head, spring means carried by the first mentioned means for urging the friction means into frictional engagement with a friction surface of the first mentioned means, spaced mutually facing abutments on said friction means, a spring seat on the brake head disposed between the abutments, spring means compressed between the spring seat and one of the abutments, and spring means carried by the first mentioned means for urging the brake head against the friction means, the capacity of the second mentioned spring means, after predetermined compression thereof, being greater than that of the first mentioned spring means, whereby upon said predetermined compression of the second mentioned spring means, the friction means are rotated against the friction surface.

3. In a brake arrangement for a railway wheel; the combination of a brake head member, a lever, pivot means connecting the member to the lever for pivotal movement relative thereto on a rotational axis, a friction member carried by said pivot means for rotational movement relative thereto on said axis, an outboardly facing friction surface on said pivot means, spring means carried by the pivot means for urging said friction member inboardly against said surface, spaced mutually facing abutments carried by one of the members, a spring seat lug carried by the other member between the abutments, spring means compressible between the lug and one of the abutments for urging the lug against the other abutment, an inboardly facing surface on the friction member, spring means carried by the pivot means for urging the brake head outboardly against the last mentioned surface, and means operatively connected to the lever and pivot means for moving the brake head toward and away from the wheel.

4. In a brake arrangement for the wheel of a railway car truck; the combination of a brake beam, a brake lever, means connecting the lever to the beam and comprising means for moving the beam toward and away from the wheel, a trunnion on said beam, a brake head rotatably mounted on the trunnion, a friction arm mounted on a portion of the trunnion outboard the head, a spring plate carried by said portion and disposed outboard said arm, spring means compressed between the plate and arm for urging the arm into engagement with the outboard end of the trunnion, a lug projecting rearwardly from the head, top and bottom lugs on said arm receiving said head lug therebetween, spring means compressed between the head lug and one of the arm lugs for urging the head lug against the other arm lug, and spring means compressed between the brake head and the beam for urging said head outboardly against said arm.

5. In a brake arrangement for a vehicle; the combination of a beam, a lever operatively connected thereto, a trunnion on the beam, a brake head member rotatably mounted on the trunnion, said beam having a smaller-diameter trunnion outboard the first mentioned trunnion, an arm member rotatably mounted on the second mentioned trunnion, spring means carried by the beam for urging the arm member against the outboard end of the first mentioned trunnion, spring means carried by the beam, the second mentioned spring means being of less capacity than that of the first mentioned spring means and being operatively associated with the head member for urging it against the arm member, spaced abutments projecting rearwardly from one of the members, a spring seat on the other member received between the spaced abutments and spring means compressed between the seat and one of the spaced abutments for urging the seat against the other of said spaced abutments upon release of the brake arrangement, said last mentioned spring means, after predetermined compression thereof, upon actuation of the brake arrangement being of greater capacity than the first mentioned spring means whereby the arm member is rotated on the smaller-diameter trunnion.

6. A brake head mounting comprising a pivot member having larger-diameter and smaller-diameter portions, a brake head rotatably mounted on one of the portions, a friction member rotatably mounted on the other portion, spring means for urging the friction member against an end of said one portion, other spring means for urging the brake head member against the friction member, abutments on respective members entirely disposed at one side of said pivot member, and spring means engaged with said abutments and stressed therebetween to yieldingly resist pivotal movement of the brake head on said one portion.

7. A brake head mounting comprising a pivot member, a brake head member and a friction member rotatably mounted on the pivot member, spring means for urging the friction member into frictional engagement with a portion of the pivot member disposed between said brake head and friction member, other spring means of lesser capacity for urging the brake head member against the friction member, and spring means reacting between the brake head and friction member for yieldingly resisting rotation of the brake head member and for effecting rotation of the friction member against said surface upon stressing of the third mentioned spring means to a maximum value.

8. In a device of the class described, a brake beam, a brake head carried thereby, said beam having an eye, a brake lever extending into the eye, a threaded member carried by the beam and extending transversely of the eye, said threaded member being in threaded engagement with the lever, a spring abutment carried by the threaded member, and spring means compressed between the abutment and the beam at one side of the eye for urging the threaded member into frictional engagement with the beam at the other side of the eye.

References Cited in the file of this patent

UNITED STATES PATENTS

| | | |
|---|---|---|
| 1,199,872 | Burton | Oct. 3, 1916 |
| 1,329,008 | Peycke | Jan. 27, 1920 |
| 1,958,264 | Chilton | May 8, 1934 |
| 2,272,647 | Simanek | Feb. 10, 1942 |
| 2,507,062 | Tack | May 9, 1950 |
| 2,507,063 | Tack et al. | May 9, 1950 |
| 2,516,696 | Gothberg | July 25, 1950 |
| 2,550,731 | Tack | May 1, 1951 |
| 2,550,732 | Tack et al. | May 1, 1951 |